United States Patent
Mehio et al.

(10) Patent No.: US 8,718,685 B2
(45) Date of Patent: May 6, 2014

(54) ENHANCED MULTIPLE SIM PAGE RECEPTION

(75) Inventors: Rami Mehio, San Diego, CA (US); Jin-Sheng Su, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/453,587

(22) Filed: Apr. 23, 2012

(65) Prior Publication Data

US 2013/0150095 A1 Jun. 13, 2013

Related U.S. Application Data

(60) Provisional application No. 61/569,621, filed on Dec. 12, 2011, provisional application No. 61/587,521, filed on Jan. 17, 2012, provisional application No. 61/595,546, filed on Feb. 6, 2012.

(51) Int. Cl.
H04W 68/00 (2009.01)

(52) U.S. Cl.
USPC .......................... 455/458; 455/466; 455/558

(58) Field of Classification Search
USPC ......................................... 455/458, 466, 558
See application file for complete search history.

(56) References Cited

U.S. PATENT DOCUMENTS

| | | |
|---|---|---|
| 2007/0157023 A1 | 7/2007 | Kotzin |
| 2009/0215473 A1 | 8/2009 | Hsu |
| 2010/0304782 A1 | 12/2010 | Chang et al. |
| 2012/0108273 A1* | 5/2012 | Lee et al. ................... 455/458 |
| 2013/0090137 A1* | 4/2013 | Krishnamoorthy et al. .. 455/458 |

FOREIGN PATENT DOCUMENTS

| | | |
|---|---|---|
| CN | 101217747 B | 5/2010 |
| GB | 2432483 | 9/2009 |
| WO | WO 2011/104580 A1 | 9/2011 |

OTHER PUBLICATIONS

European Search Report, App. No. 12008034.6-1854, dated Apr. 5, 2013.
Espacenet Bibliographic Data, A method of paging channel monitoring of the dual-card dual-standby mobile telephone, English language abstract of CN 101217747 B, 1 page, printed May 15, 2013.
Universal Mobile Telecommunications System (UMTS); Physical channels and mapping of transport channels onto physical channels (FDD) (3GPP TS 25.211 version 8.7.0 Release 8), Ref. ETSI TS 125 211 V8.7.0 (Oct. 2010), European Telecommunications Standards Institute 2010.
3rd Generation Partnership Project; Technical Specification Group Radio Access Network; Physical channels and mapping of transport channels onto physical channels (FDD), Technical Specification, 26pp., 3GPP TS 25.211, V8.7.0, dated Sep. 2010.
Author unknown, UMTS Paging, 3pp., dated: Copyright 1999-2003.

* cited by examiner

*Primary Examiner* — Nghi H Ly
(74) *Attorney, Agent, or Firm* — Brinks Gilson & Lione

(57) ABSTRACT

A technique for receiving paging information helps a mobile communication device with multiple SIMs to better determine that a call is incoming. Despite the paging indicators for both SIMs arriving in a manner that prevents both the paging indicators from being received, the technique is able to ascertain whether a SIM is being paged, even when the other SIM is currently on the radio interface. As a result, the mobile communication device exhibits an increased ability to detect and alert the user to incoming calls.

20 Claims, 7 Drawing Sheets

ENHANCED MULTIPLE SIM PAGE RECEPTION

PRIORITY CLAIM

This application claims the benefit of priority to the following U.S. provisional patent applications:
U.S. Patent Application No. 61/569,621, filed 12 Dec. 2011;
U.S. Patent Application No. 61/587,521, filed 17 Jan. 2012; and
U.S. Patent Application No. 61/595,546, filed 6 Feb. 2012.

TECHNICAL FIELD

This disclosure relates to communication devices with multiple Subscriber Identity Modules (SIMs). The disclosure also relates to enhanced reception of paging indicators in communication devices with multiple SIMs.

BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at nearly 80% of the world's population. Furthermore, other estimates indicate that (as just three examples) the United States, Italy, and the UK have more mobile phones in use in each country than there are people living in those countries.

Relatively recently, cellular phone manufactures have introduced phone designs that include multiple SIM cards. Each SIM card facilitates a separate connection to the same network or different networks. As a result, the SIMs provide the owner of the phone with, for example, two different phone numbers handled by the same phone hardware. Accordingly, the multiple SIM approach alleviates to some degree the need to carry different physical phones, and improvements in multiple SIM communication devices will continue to make such devices attractive options for the consumer.

BRIEF DESCRIPTION OF THE DRAWINGS

The innovation may be better understood with reference to the following drawings and description. In the figures, like reference numerals designate corresponding parts throughout the different views.

DETAILED DESCRIPTION

The discussion below makes reference to user equipment. User equipment may take many different forms and have many different functions. As one example, user equipment may be a cellular phone capable of making and receiving wireless phone calls. The user equipment may also be a smartphone that, in addition to making and receiving phone calls, runs general purpose applications. User equipment may be virtually any device that wirelessly connects to a network, including as additional examples a driver assistance module in a vehicle, an emergency transponder, a pager, a satellite television receiver, a networked stereo receiver, a computer system, music player, or virtually any other device. The discussion below addresses how to manage paging reception in user equipment that includes multiple (e.g., two) SIMs.

Figure 1:
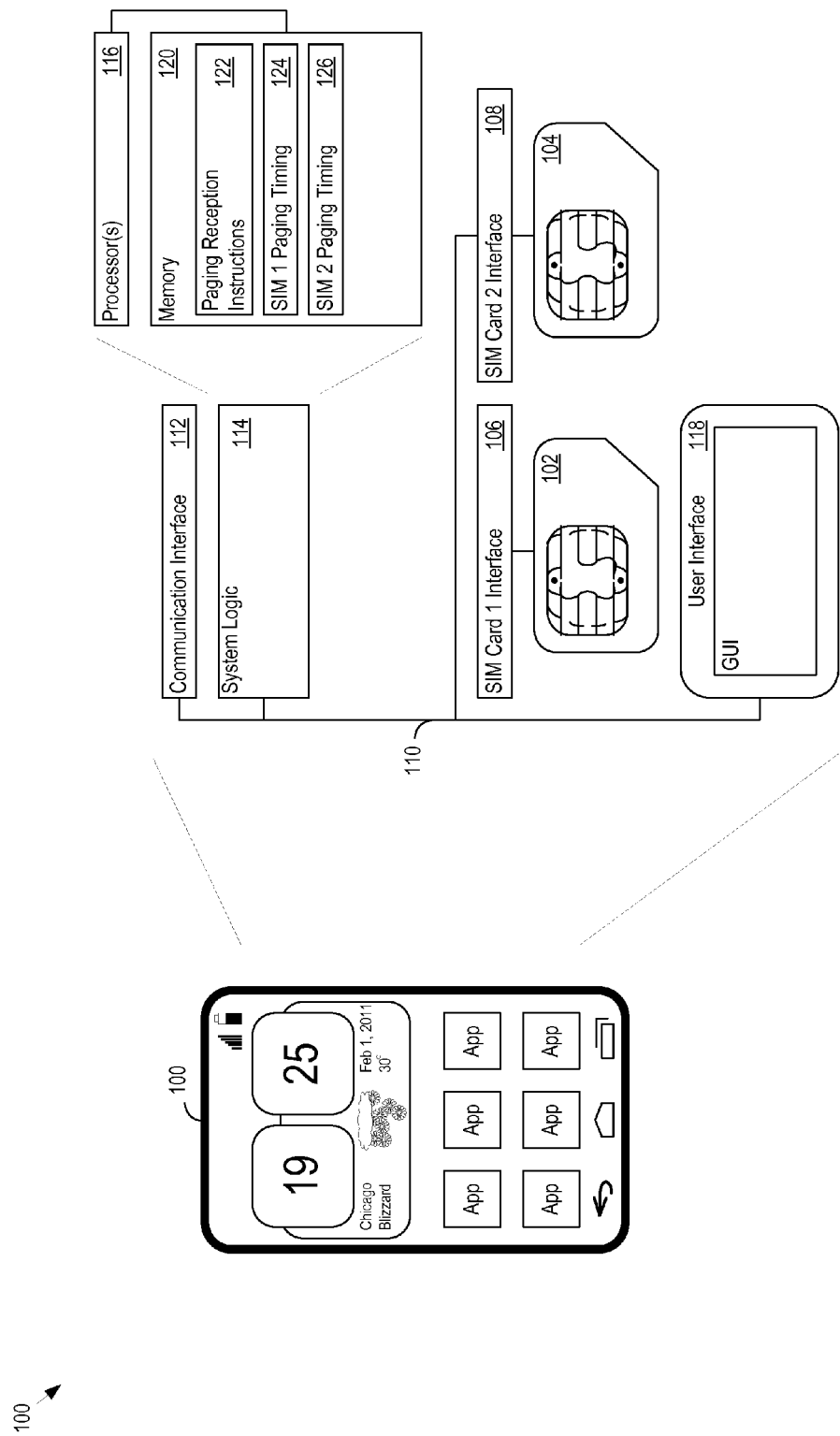
FIG. 1 shows an example of user equipment with multiple SIMs.

FIG. 1 shows an example of user equipment 100 with multiple SIMs, in this example the SIM1 102 and the SIM2 104. An electrical and physical interface 106 connects SIM1 102 to the rest of the user equipment hardware, for example, to the system bus 110. Similarly, the electrical and physical interface 108 connects the SIM2 to the system bus 110.

The user equipment 100 includes a communication interface 112, system logic 114, and a user interface 118. The system logic 114 may include any combination of hardware, software, firmware, or other logic. The system logic 114 may be implemented, for example, in a system on a chip (SoC), application specific integrated circuit (ASIC), or other circuitry. The system logic 114 is part of the implementation of any desired functionality in the user equipment. In that regard, the system logic 114 may include logic that facilitates, as examples, running applications, accepting user inputs, saving and retrieving application data, establishing, maintaining, and terminating cellular phone calls, wireless network connections, Bluetooth connections, or other connections, and displaying relevant information on the user interface 118. The user interface 118 may include a graphical user interface, touch sensitive display, voice or facial recognition inputs, buttons, switches, and other user interface elements.

The communication interface 112 may include one or more transceivers. The transceivers may be wireless transceivers that include modulation/demodulation circuitry, amplifiers, analog to digital and digital to analog converters and/or other logic for transmitting and receiving through one or more antennas, or through a physical (e.g., wireline) medium. The transmitted and received signals may adhere to any of a diverse array of formats, protocols, modulations, frequency channels, bit rates, and encodings that presently or in the future support communications including paging notifications associated with SIMs. As one specific example, the communication interface 112 may support transmission and reception under the Universal Mobile Telecommunications System (UMTS). The techniques described below, however, are applicable to other communications technologies that include paging whether arising from the 3rd Generation Partnership Project (3GPP), GSM® Association, Long Term Evolution (LTE)™ efforts, or other partnerships or standards bodies.

In one implementation, the system logic 114 includes one or more processors 116 and a memory 120. The memory 120 stores, for example, paging reception instructions 122 that the processor 114 executes. The memory 120 may also store SIM1 paging timing information 124 and SIM2 paging timing information 126. As will be described in more detail below, the paging reception instructions 122 facilitate the detection and reception of incoming calls that might otherwise be missed.

Figure 2:
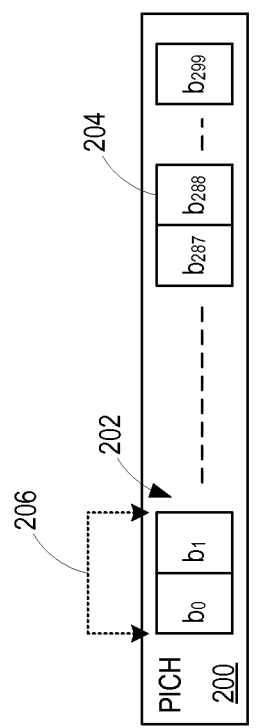
FIG. 2 is an example of a paging indicator channel that carries paging indicators.

FIG. 2 is an example of a paging indicator channel (PICH) 200 that carries paging indicators 202. The PICH 200 shown in FIG. 2 is a UMTS PICH that includes 300 bits. The first 288 bits are used for paging indicators, while the last 12 bits are reserved (e.g., reserved bit 204). In each PICH 200, a predetermined number of paging indicators are present, such as 18, 36, 72, or 144. If a paging indicator in a PICH frame 200 is set to '1' then that provides an indication that the user equipment associated with that paging indicator is being paged. Further, a paging indicator that is set to '1' indicates that the user equipment should read the corresponding frame of the associated S-CCPCH or corresponding subframes of the associated shared control channel (HS-SCCH) that follow the PICH 200 to obtain additional paging information that may be present in a paging message in the S-CCPCH or HS-SCCH.

A paging indicator may be one or more bits or one or more symbols in the PICH 200. In particular, when there are 18 indicators present, each indicator may span 16 bits (e.g., bits zero through 15, 16 through 31, and so on), when there are 36 indicators present, each indicator may span 8 bits, when there are 72 indicators present, each indicator may span 4 bits, and when there are 144 indicators present, each indicator may span 2 bits. Thus, bit zero and bit one may form a paging indicator 206, for example, when there are 144 indicators present. The paging indicator may be set (e.g., active or True) if all of its bits (e.g., bit zero and bit one) are set to '1', and may be unset (e.g., inactive or False) if all of its bits are set to '0'.

Each paging indicator has a position 'q' within the PICH 200. The user equipment 100 determines the position 'q' of its paging indicator using information supplied by the network. In that regard, the network may configure the user equipment 100 to start listening for paging indicators and provide all or part of the information for determining the position 'q'. An example of this determination is provided in section 5.3.3.10 of V8.7.0 of the 3GPP technical specification for group radio access network and is reproduced below:

$$q = \left(PI + \left\lfloor((18 \times (SFN + \lfloor SFN/8 \rfloor + \lfloor SFN/64 \rfloor + \lfloor SFN/512 \rfloor)) \bmod 144) \times \frac{Np}{144}\right\rfloor\right) \bmod Np$$

The timing information may include, as examples, Np (the number of paging indicators), PI (higher layer paging indicator; an offset from 0 to Np−1 assigned by the radio network to the user equipment), DRX (discontinuous reception) cycle length, and SFN (system frame number). Because the user equipment has multiple SIMs, it may receive multiple paging configuration messages from the same or different networks. The information contained in the configuration messages may be stored in the memory 120 for SIM1 as the SIM1 paging timing 124, and for SIM2 as the SIM2 paging timing 126.

Figure 3:
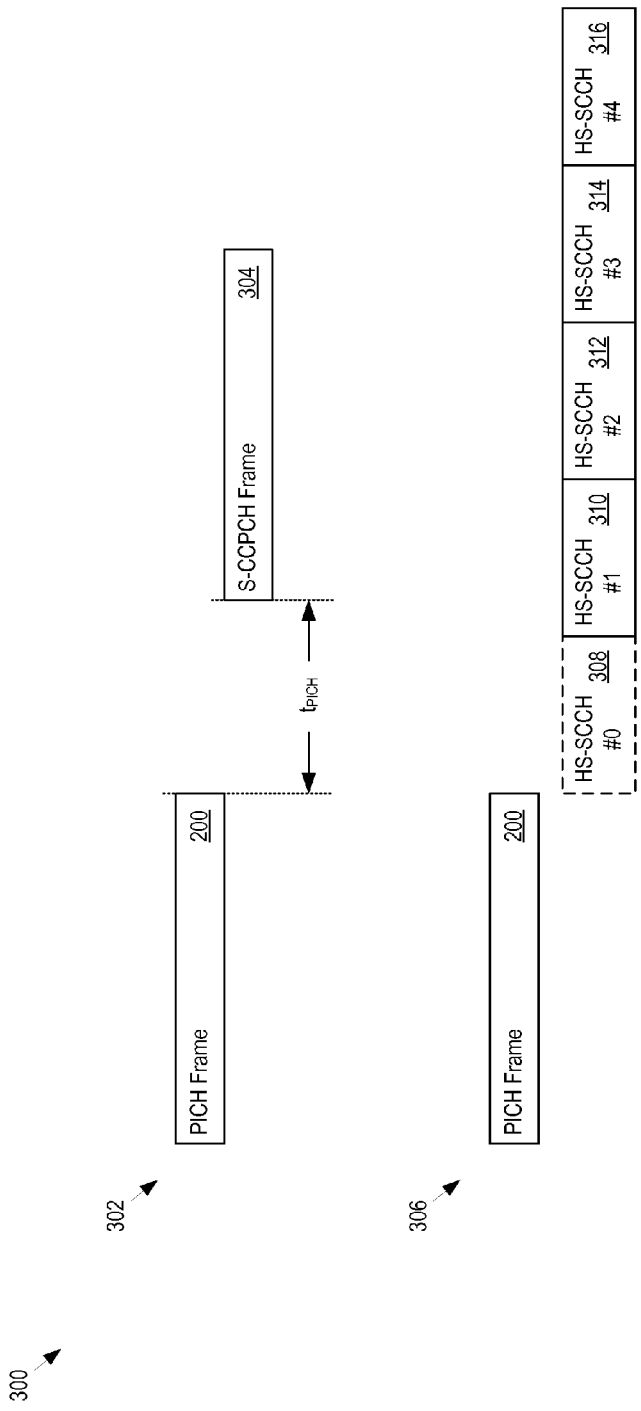
FIG. 3 shows an example of timing for the paging indicator channel and an associated secondary common control physical channel (SCCPCH) frame.

FIG. 3 shows timing example 300 for the paging indicator channel and following paging information. The timing is associated with a particular SIM, and each of SIM1 102 and SIM2 104 may have different timings. In particular, FIG. 3 shows a timing example 302 in which the PICH 200 is followed, after time $t_{PICH}$, by an associated secondary common control physical channel (S-CCPCH) frame 304. The $t_{PICH}$ time may be 7680 chips (e.g., three time slots), for example. The S-CCPCH frame 304 carries the paging message for the user equipment 100 when the PICH 200 indicates that the user equipment is being paged. Alternatively, timing example 306 shows that high speed shared control channel (HS-SCCH) subframes (e.g., the subframe zero 308, one 310, two 312, three 314, and four 316) may follow the PICH 200. The paging message for the user equipment 100 may be present in one of the HS-SCCH subframes.

The discussion below continues with reference to the S-CCPCH paging messages, but the discussion is equally applicable with respect to the HS-SCCH paging messages. Also, the techniques discussed below are not limited to any particular form or content of the PICH 200, S-CCPCH 304, or HS-SCCH 308-316. Instead, the paging reception techniques apply to many other types and formats of messages that may be used for sending paging indicators to user equipment, with the specific paging messages following in time.

Figure 4:
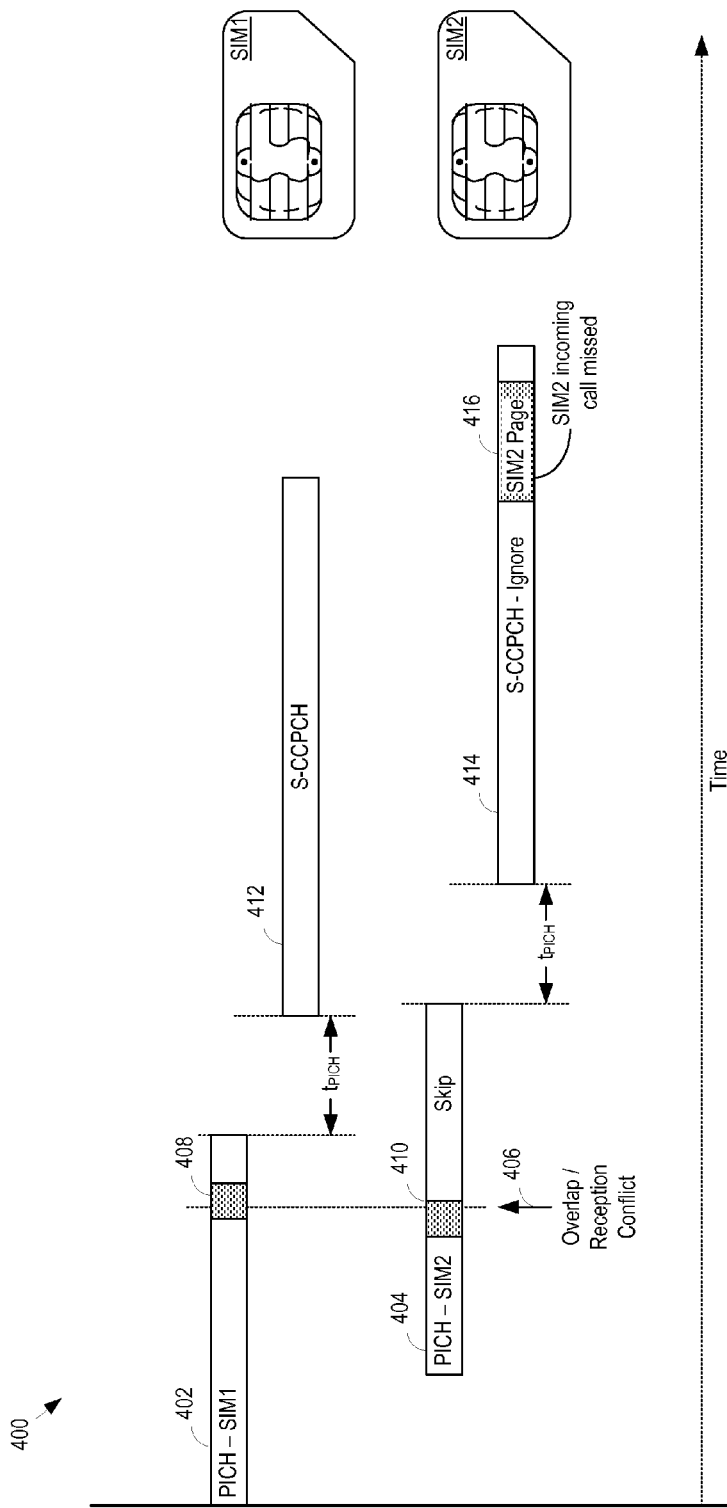
FIG. 4 shows an example of conflict in receiving both the paging indicator for SIM1 and the paging indicator for SIM2.

The paging message may indicate, for example, that the associated SIM has an incoming voice call. FIG. 4 shows an example 400 of conflict in receiving both the paging indicator for SIM1 and the paging indicator for SIM2. In particular, the SIM1 PICH 402 and the SIM2 PICH 404 carry paging indicators as noted above. Because different networks may serve SIM1 and SIM2, the SIM1 PICH 402 and SIM2 PICH 404 may overlap in time. As a result, the individual paging indicator positions for SIM1 102 and SIM2 104 may overlap in time. In FIG. 4, the overlap positions are shown at point 406, with the timing of the SIM1 paging indicator 408 overlapping with the timing of the SIM2 paging indicator 410.

The overlap in timing causes a conflict between the reception of both paging indicators 408 and 410. One source of the conflict is that both SIM1 102 and SIM2 104 share access to the communication interface 112. For example, there may be one set of transceiver circuitry that both SIM1 102 and SIM2 104 share in time division manner. As a result, the user equipment 100 must decide which paging indicator to receive, as SIM1 102 and SIM2 104 cannot both be active on the communication interface 112 at the same time.

It should also be noted that overlap between the paging indicators is not the only reason that there may be a conflict between reception of both paging indicators. Instead, conflict may also arise even if there is no overlap in time between paging indicators, when there is not sufficient time to switch the communication interface 112 over to SIM2 in order to receive both paging indicators. As another example, conflict may arise even if there is no overlap between paging indicators, when the user equipment 100 cannot interrupt the radio access of the active SIM. This may be the case, for example, because the active SIM is transmitting or receiving high priority data or voice information.

FIG. 4 assumes that SIM1 102 is active SIM on the communication interface 122. As noted above, the user equipment cannot receive both paging indicators 408 and 410. Therefore, the user equipment 100 typically would receive the active SIM's paging indicator. In the example of FIG. 4, the user equipment 100 would receive the SIM1 paging indicator 408 and the associated S-CCPCH 412, if the paging indicator was positive. The user equipment 100 would skip reception of the SIM2 paging indicator 410 due to the conflict and skip reception of the SIM2 S-CCPCH 414. As a result of ignoring the SIM2 PICH 404 and the SIM2 S-CCPCH 414, the user equipment 100 may miss a SIM2 paging message 416 in the SIM2 S-CCPCH (or HS-SCCH). Missing the paging message causes the user equipment to not receive, for example, an incoming phone call or other communication.

Figure 5:
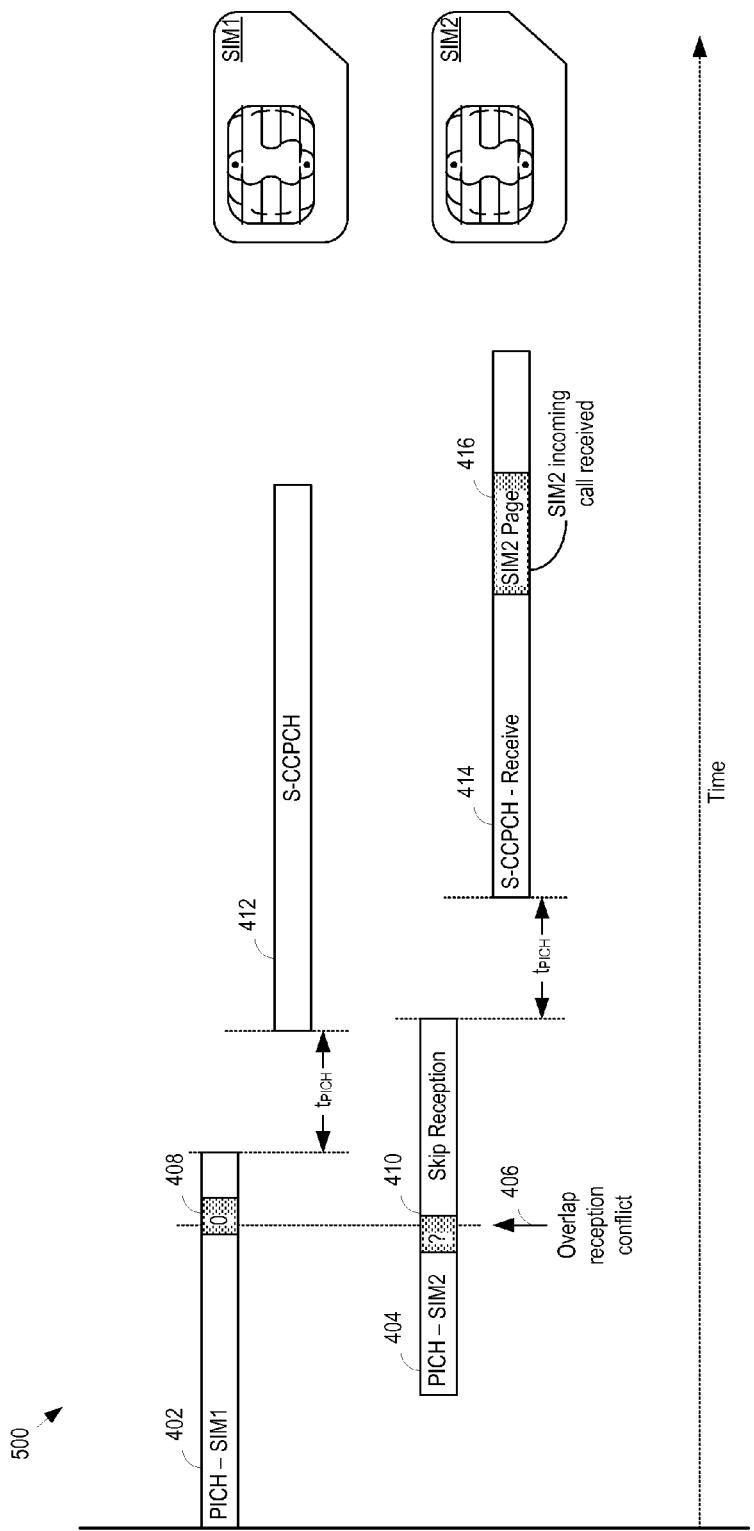
FIG. 5 shows an example of a conflict resolution technique when there is a conflict in receiving both the paging indicator for SIM1 and the paging indicator for SIM2.

FIG. 5 shows a conflict resolution technique 500 when there is overlap in receiving both the paging indicator for SIM1 408 and the paging indicator for SIM2 410. The conflict resolution technique 500 proceeds as follows. SIM1 102 is active. The user equipment 100 determines the paging indicator position for SIM1 102 and SIM2 104 using the SIM1 timing information 124 and the SIM2 timing information 126. In particular, the user equipment 100 determines that there is a conflict between receiving both the SIM1 paging indicator 408 and the SIM2 paging indicator 410.

Because SIM1 is active, the user equipment 100 may decide to receive the SIM1 paging indicator 408. The user equipment skips reception of the SIM2 paging indicator 410. In the case where the SIM1 paging indicator 408 is false, the user equipment need not receive the SIM1 S-CCPCH 412 (or HS-SCCH). Instead, the user equipment 100, without knowing that the SIM2 is being paged (because the user equipment 100 skipped reception of the SIM2 paging indicator 410), switches radio access to SIM2, and receives the SIM2 S-CCPCH (or HS-SCCH). As a result, the user equipment 100 may detect that the network is paging SIM2, because the user equipment 100 finds the SIM2 paging message 416.

The user equipment 100 may also skip the SIM2 paging indicator 410 and receive the SIM2 S-CCPCH 414 even if the SIM1 paging indicator 408 is true. This may occur if the timing permits reception of the relevant part of the SIM1 S-CCPCH 412, then switching radio access to receive all or part of the SIM2 S-CCPCH 414. The user equipment may then check for SIM2 paging messages in whatever part of the SIM2 S-CCPCH 414 was received.

It may be that paging messages are infrequent and that most receptions of the SIM2 S-CCPCH, without reception of the SIM2 paging indicator 410, find no paging message for SIM2. Nevertheless, any extra increase in successfully detecting paging messages can enhance the operation of the user equipment. The enhanced operation may also lead to increased customer satisfaction with the user equipment 100. Once the SIM2 paging message is detected, the user equipment 100 may, for example, alert the user to the incoming page by issuing a notification through the user interface 118, and accept input from the user to determine whether to answer the page.

Figure 6:
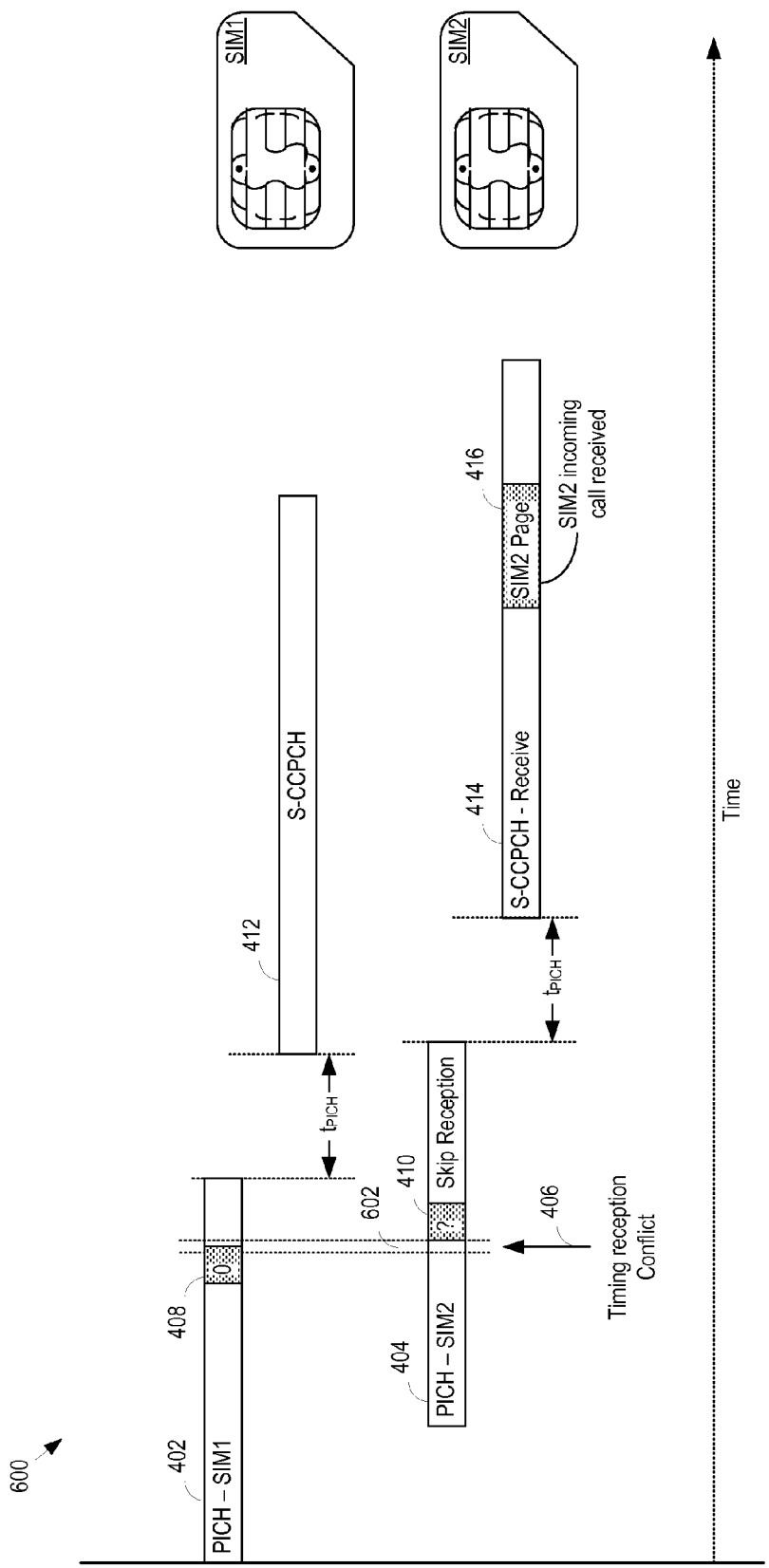
FIG. 6 shows an example of a conflict resolution technique when there is a conflict in receiving both the paging indicator for SIM1 and the paging indicator for SIM2.

FIG. 6 shows a conflict resolution technique 600 when there is conflict in receiving both the paging indicator for SIM1 408 and the paging indicator for SIM2 410. The conflict resolution technique 600 proceeds as follows. SIM1 102 is active. The user equipment 100 determines the paging indicator timing for SIM1 102 and SIM2 104 using the SIM1 timing information 124 and the SIM2 timing information 126. In particular, the user equipment 100 determines that there is a conflict between receiving both the SIM1 paging indicator 408 and the SIM2 paging indicator 410. In this example, the paging indicators 408 and 410 do not overlap in time, but there is a conflict because the user equipment cannot switch the radio access to SIM2 in time to receive the SIM2 paging indicator 410. Said another way, the timing difference 602 between the SIM1 paging indicator 408 and the SIM2 paging indicator 410 is less than a reception timing threshold.

Because SIM1 is active, the user equipment 100 may determine to receive the SIM1 paging indicator 408. The user equipment skips reception of the SIM2 paging indicator 410. In the case where the SIM1 paging indicator 408 is false, the user equipment need not receive the SIM1 S-CCPCH 412 (or HS-SCCH). Instead, the user equipment 100, without knowing that the SIM2 is being paged (because the user equipment 100 skipped reception of the SIM2 paging indicator 410), switches radio access to SIM2, and receives the SIM2 S-CCPCH (or HS-SCCH). As a result, the user equipment 100 may detect that the network is paging SIM2, because the user equipment 100 finds the SIM2 paging message 416.

Figure 7:
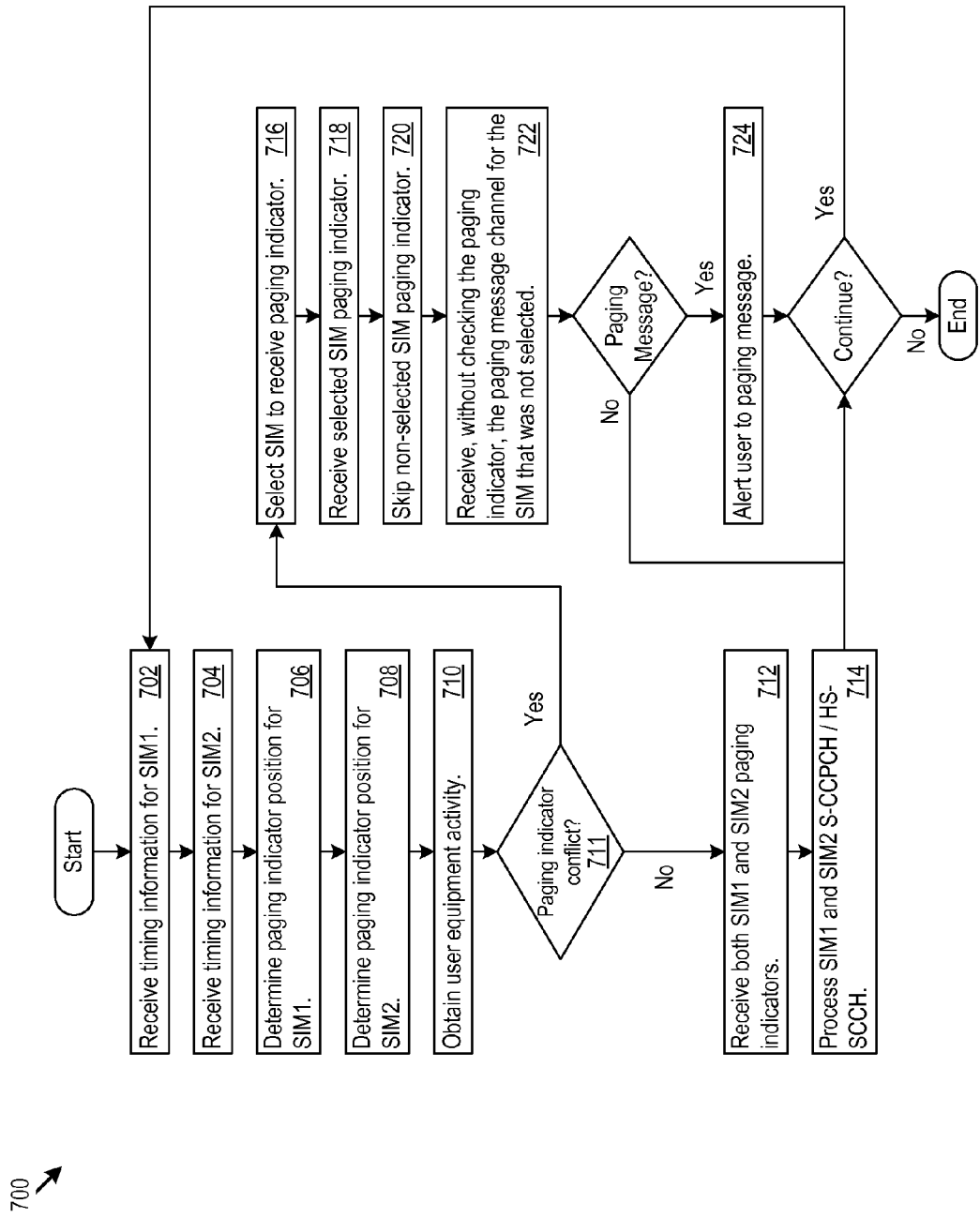
FIG. 7 shows paging reception logic that user equipment may implement, in hardware, software or both.

FIG. 7 shows paging reception logic (PRL) 700 that the user equipment may implement, in hardware, software or firmware, or both. For example, the PRL 700 may be implemented in software as the paging reception instructions 122. The PRL 700 receives paging indicator timing information for SIM1 (702) and for SIM2 (704). With the timing information, the PRL 700 determines the upcoming paging indicator position for SIM1 (706) and for SIM2 (708). Furthermore, the PRL 700 may obtain any additional system information, if any, to facilitate determining whether there is a conflict in receiving both the paging indicators for SIM1 and for SIM2 (710). For example, the additional system information may include user equipment activity information that represents the level of priority of any ongoing communications, how quickly the user equipment can switch radio access between SIMs (including the reception timing threshold mentioned above), user preference information that may indicate whether incoming calls are of interest or not, and other system information.

The PRL 700 compares the paging indicator positions and analyzes the system information to determine whether there is a conflict in receiving the paging indicators for both SIMs (711). A conflict may exist, as one example, because the paging indicators overlap in time. A conflict may also exist, as another example, because there is not sufficient time to switch the radio access to SIM2 to receive its paging indicator. As additional examples, 1) a conflict may exist because the currently active SIM has high priority traffic occurring that should not be interrupted to receive the paging indicator for the inactive SIM, 2) because the user preference information is set to request that the user equipment 100 skip reception of paging indicators, 3) because the user preference information indicates a low power mode of operation that does not permit the user equipment to switch radio access for checking paging indicators, or 4) for other reasons.

If there is no conflict, then the PRL 700 may receive both the SIM1 and SIM2 paging indicators (712). The PRL may also then determine whether either of SIM1 or SIM2 is being paged by examining the paging indicators. If a SIM is being paged, the PRL 700 may receive and process the paging messages in the corresponding S-CCPCH (or HS-SCCH) (714).

Otherwise, if there is a conflict in receiving the paging indicators for both SIMs (711), the PRL 700 may determine which SIM's paging indicator it will receive (716). For example, the PRL 700 may select the currently active SIM, may select a SIM with highest priority, or may make a selection based on other selection criteria. The PRL 700 receives the paging indicator for the selected SIM (718), and skips the paging indicator for the non-selected SIM (720).

Although the PRL 700 has skipped reception of the paging indicator for the non-selected SIM, the PRL 700 receives the paging message channel for the SIM that was not selected (722). If the PRL 700 finds a paging message, then the PRL may alert the user to the paging message (724). Otherwise, the PRL 700 may continue its analysis to determine reception conflicts and address them as described above.

The systems and techniques described above may be incorporated into any user equipment. As one example, the user equipment may include a wireless radio interface, a first SIM card interface for a first SIM card, a second SIM card interface to a second SIM card, a processor in communication with the wireless radio interface and SIM card interfaces, and a memory in communication with the processor. The memory may store paging reception logic that when executed by the processor, causes the processor to determine a first paging indicator position for a first paging indicator for the first SIM card, determine a second paging indicator position for a second paging indicator for the second SIM card, determine that the first paging indicator and the second paging indicator cannot both be received by the wireless radio interface, and determine which of the first paging indicator and the second paging indicator to skip.

The paging reception logic may also cause the processor to, for the first SIM, receive a first paging message that follows the first paging indicator, when the first paging indicator is skipped. The paging reception logic may thereby receive the first paging message without previously determining that the first SIM is being paged. The paging reception logic may skip the first paging indicator when the second SIM is active on the wireless radio interface, for example. The paging indicators may not both be able to be received because, for example, the second SIM is active on the wireless radio interface at approximately the time of the first paging indicator position.

Another aspect of the techniques may be described in that the user equipment determines timing overlap between a first subscriber identity module (SIM) paging indicator for a first SIM, and a second SIM paging indicator for a different second SIM. When there is overlap, the user equipment skips reception of the second SIM paging indicator and instead receives a second SIM paging message that follows the second SIM paging indicator.

In yet another aspect, a system includes: a communication interface and logic in communication with the communication interface. The logic is operable to obtain paging timing information for a first SIM and for a second SIM that is different than the first SIM, and determine that a conflict exists between reception of both first SIM paging information for the first SIM and second SIM paging information for the second SIM. When the conflict exists, the system may skip reception of the second SIM paging information when the first SIM is active on the communication interface and instead receive a second SIM paging message that follows the second SIM paging information. Furthermore, the system may skip reception of the first SIM paging information when the second SIM is active on the communication interface and instead receive a first SIM paging message that follows the first SIM paging information.

The methods, devices, techniques, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:
1. A method comprising:
  determining timing overlap between:
    a first subscriber identity module (SIM) paging indicator for a first SIM; and
    a second SIM paging indicator for a second SIM, the second SIM different from the first SIM; and
  when there is overlap, skipping reception of the second SIM paging indicator and instead receiving a second SIM paging message that follows the second SIM paging indicator.
2. The method of claim 1, further comprising:
  receiving the first SIM paging indicator instead of the second SIM paging indicator.
3. The method of claim 1, further comprising:
  analyzing the second SIM paging message to determine whether the second SIM is being paged.
4. The method of claim 1, where:
  receiving the second SIM paging message occurs without first determining whether the second SIM is being paged.
5. The method of claim 1, further comprising:
  receiving paging timing information for the first SIM;
  receiving paging timing information for the second SIM; and
  determining the timing overlap based on the paging timing information for the first SIM and the paging timing information for the second SIM.
6. The method of claim 5, further comprising:
  determining a paging indicator position for the first paging indicator; and
  determining a paging indicator position for the second paging indicator.
7. The method of claim 6, where determining timing overlap comprises:
  determining that the paging indicator position for the first paging indicator and the paging indicator position for the second paging indicator do not permit both the first paging indicator and the second paging indicator to be received.
8. A system comprising:
  a communication interface; and
  logic in communication with the communication interface, the logic operable to:
    obtain paging timing information for a first SIM and for a second SIM that is different than the first SIM;
    determine that a conflict exists between reception of both first SIM paging information for the first SIM and second SIM paging information for the second SIM; and
    when the conflict exists:

skip reception of the second SIM paging information when the first SIM is active on the communication interface and instead receive a second SIM paging message that follows the second SIM paging information; and skip reception of the first SIM paging information when the second SIM is active on the communication interface and instead receive a first SIM paging message that follows the first SIM paging information.

9. The system of claim 8, where:
the first SIM paging information comprises a first SIM paging indicator, the second SIM paging information comprises a second SIM paging indicator, or both.

10. The system of claim 8, where:
the logic is operable to instead receive the second SIM paging messaging without first determining that the second SIM is being paged.

11. The system of claim 8, where:
the logic is operable to instead receive the first SIM paging message without first determining that the first SIM is being paged.

12. The system of claim 8, where:
the paging timing information comprises paging indicator timing within a paging channel that the communication interface is configured to receive for both the first SIM and the second SIM.

13. The system of claim 8, where:
the paging timing information comprises paging indicator position within a paging channel that the communication interface is configured to receive for both the first SIM and the second SIM.

14. The system of claim 8, where the logic is further operable to:
analyze the second SIM paging message to determine whether the second SIM is being paged.

15. A system comprising:
a wireless radio interface;
a first SIM card interface for a first SIM card;
a second SIM card interface to a second SIM card;
a processor in communication with the wireless radio interface and SIM card interfaces; and
a memory in communication with the processor, the memory comprising paging reception logic configured to, when executed by the processor, cause the processor to:
determine a first paging indicator position for a first paging indicator for the first SIM card;
determine a second paging indicator position for a second paging indicator for the second SIM card;
determine that the first paging indicator and the second paging indicator cannot both be received by the wireless radio interface; and
determine which of the first paging indicator and the second paging indicator to skip.

16. The system of claim 15, where the paging reception logic is further configured to cause the processor to:
for the first SIM, receive a first paging message that follows the first paging indicator, when the first paging indicator is skipped.

17. The system of claim 16, where the paging reception logic is operable to receive the first paging message without first determining that the first SIM is being paged.

18. The system of claim 16, where the paging reception logic is operable to skip the first paging indicator when the second SIM is active on the wireless radio interface.

19. The system of claim 16, where the paging reception logic is operable to skip the first paging indicator when the second SIM is active on the wireless radio interface at approximately when the first paging indicator position occurs.

20. The system of claim 15, where the paging reception logic is operable to determine which of the first paging indicator and the second paging indicator to skip by determining which of the first SIM and the second SIM have been assigned the wireless radio interface.

* * * * *